(12) United States Patent
Masaaki

(10) Patent No.: US 6,296,938 B1
(45) Date of Patent: Oct. 2, 2001

(54) REINFORCING COMPOUNDING MATERIAL

(75) Inventor: Kouichi Masaaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/238,732

(22) Filed: Jan. 28, 1999

(30) Foreign Application Priority Data

Jan. 30, 1998 (JP) .................................................. 10-019574

(51) Int. Cl.$^7$ ...................................................... B32B 5/16
(52) U.S. Cl. .......................................... 428/404; 428/405
(58) Field of Search .................................... 428/403, 404, 428/405

(56) References Cited

U.S. PATENT DOCUMENTS

| | | | |
|---|---|---|---|
| 3,928,270 | * | 12/1975 | South, Jr. .............................. 152/330 |
| 4,740,538 | * | 4/1988 | Sekutowski ........................... 523/205 |
| 4,828,954 | * | 5/1989 | Hashimoto et al. .................. 430/110 |
| 5,034,222 | * | 7/1991 | Kellett et al. ......................... 424/76.4 |
| 5,891,235 | * | 4/1999 | Suzuki et al. ......................... 106/483 |
| 6,027,817 | * | 2/2000 | Otsuki et al. ......................... 428/461 |

* cited by examiner

*Primary Examiner*—Hoa T. Le
(74) *Attorney, Agent, or Firm*—Armstrong, Westerman, Hattori, McLeland & Naughton, LLP

(57) ABSTRACT

The reinforcing compounding material includes a natural zeolite that has been surface-treated by a silane coupling agent. The zeolite may have a grain diameter not more than 6 μm and may be a pre-dried zeolite. The silane coupling agent may have a chemical formula described hereunder: R—Si(OR')$_3$, in which R is one selected among amino-, vinyl-, epoxy-, mercapto-, chlorine-, and methacryl-; R' is one selected among methyl-, ethyl-, and β-methoxyethyl-. The silane coupling agent may be a α-aminopropyltriethoxysilane.

3 Claims, 1 Drawing Sheet

REINFORCING COMPOUNDING MATERIAL

FIELD OF THE INVENTION

The present invention relates to a reinforcing material compounded in a polymer like rubber or synthetic resin.

BACKGROUND OF THE INVENTION

Conventionally, a compounding material has been added to a polymer like rubber or synthetic resin so as to improve its physical characteristics of tensile strength, rigidity modulus, hardness, elasticity, frictional coefficient, or etc. Such compounding material is called as a reinforcing compounding material. For these reinforcing materials, there has been used carbon, light hydroxycalcium carbonate, silicon oxide, colloidal calcium carbonate, or etc. Recently, an increasing amount of a polymer material like synthetic rubber in industrial application has increased need of carbon black, silica (white carbon) and clay as a reinforcing material compounded in the polymer.

Such increasing need of reinforcing compounding materials like carbon black has kept them in a higher price. This has restricted that products made of a polymer material like rubber or synthetic resin with the reinforcing materials become lower in production cost.

SUMMARY OF THE INVENTION

The present invention aims to eliminate such disadvantage. That is, an object of the present invention is to provide a reinforcing material, which has a reinforced strength not less than known reinforcing materials such as carbon black, with a lower cost.

For achieving the object, the inventor of this application has made a research and found that a natural zeolite, which has been surface-treated by a silane coupling agent, has a reinforcing strength not less than the known reinforcing materials like carbon black. This led to the present invention.

That is, a reinforcing compounding material according to the invention includes a zeolite that has been surface-treated by a silane coupling agent.

The zeolite may be a natural zeolite.

The zeolite may have a grain diameter not more than 6 $\mu$m.

The zeolite may be a pre-dried zeolite.

The silane coupling agent may have a chemical formula described hereunder:

R—Si(OR')₃, in which R is one selected among amino-, vinyl-, epoxy-, mercapto-, chlorine-, and methacryl-; R' is one selected among methyl-, ethyl-, and β-methoxyethyl-.

The silane coupling agent may be a α-aminopropyltriethoxysilane.

BRIEF DESCRIPTION OF THE ACCOMPANIED DRAWINGS

Figure 1:
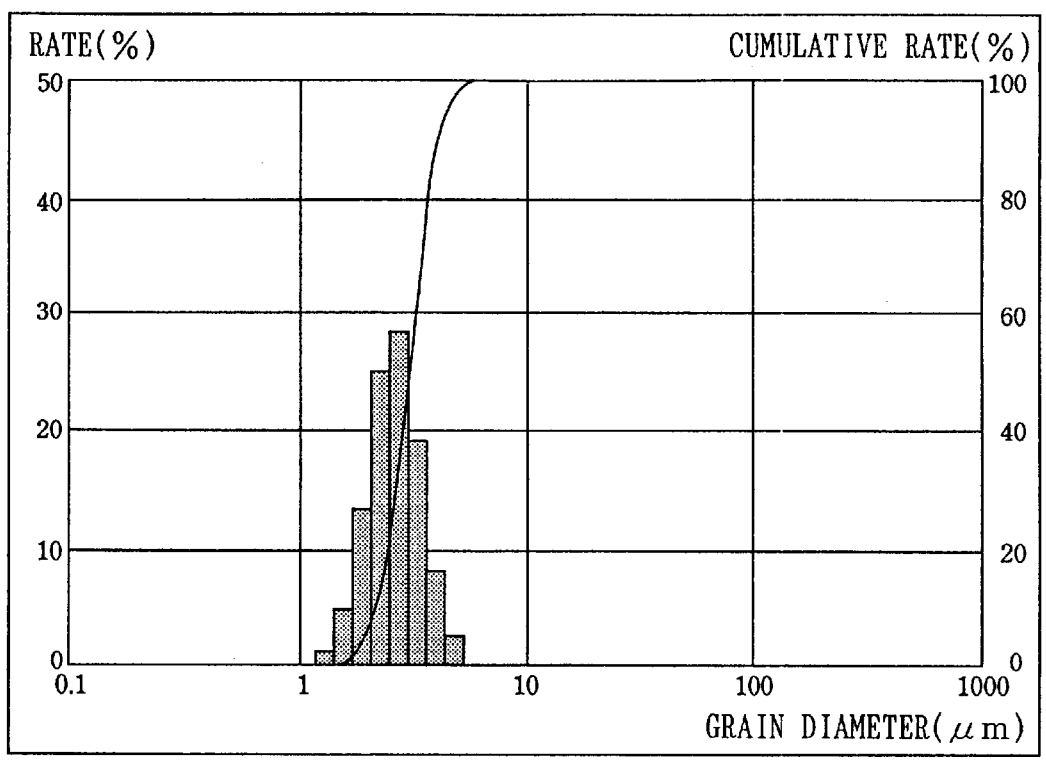
Figure 2:
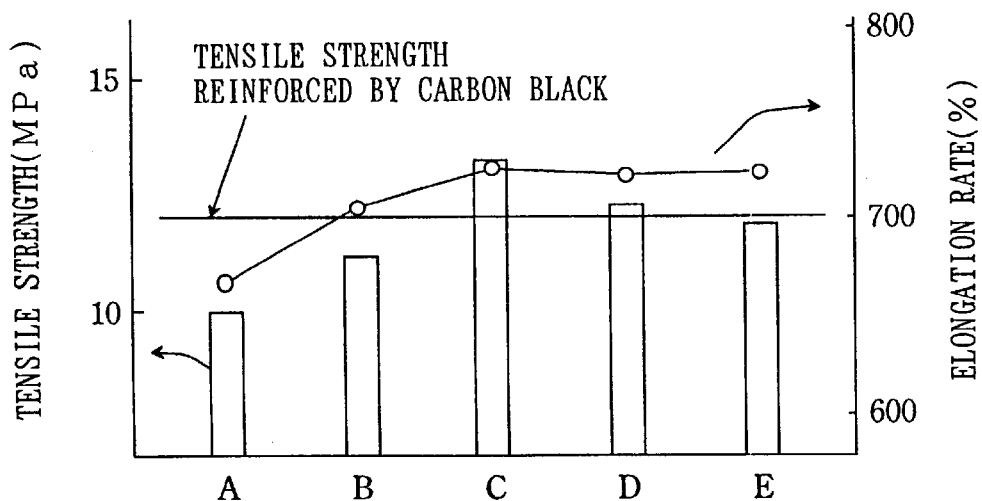

FIG. 1 is a graph showing a grain diameter distribution of a natural zeolite that is used in a comparative example 1 and embodiments 1 to 4 of the present invention; and FIG. 2 is a graph showing tensile strength (MPa) and elongation ratio (%) of test pieces A to E regarding the comparative example 1 and the embodiments 1 to 4.

DESCRIPTION OF PREFERRED EMBODIMENT

A zeolite used in the present invention is preferably a not expensive natural zeolite and may be a synthetic zeolite.

A silane coupling agent used in the present invention is a compound selected among γ-(2-aminoethyl)aminopropyltrimethoxysilane, γ-(2-aminoethyl)aminopropylmethyldimethoxysilane, β-methoxyethyivnyltrimethoxysilane, vinyltriacetoxysilane, γ-glycidoxypropyltrimethoxysilane, γ-mercaptopropyltrimethoxysilane, γ-chloropropyltrimethoxysilane, γ-methacryloxypropyltrimethoxysilane, and etc. However, the silane coupling agent is not limited within the above-described compounds, but may be another compound related to the present invention.

COMPARATIVE EXAMPLE 1

Test piece A (called as "A" hereinafter) was made by uniformly mixing 100 weight units of an ethylene-propylene-diene ternary polymerization elastomer (called as "EPDM" hereinafter), 50 weight units of a natural zeolite, 80 weight units of a talc, 60 weight units of a paraffin oil, 2 weight units of stearic acid, 5 weight units of zinc oxide, 4 weight units of a cross linking agent, and 0.5 weight units of sulfur.

The zeolite has been obtained by crushing and classifying a natural zeolite, which has the grain diameter distribution shown in FIG. 1. In the graph of FIG. 1, an average grain diameter ($\mu$m) of each column is equal to 1.64, 1.94, 2.31, 2.75, 3.27, 3.89, 4.62, or 5.50 sequentially from left to right. The zeolite has been pre-dried (but called as "natural zeolite" hereinafter).

Regarding "A", a break tensile strength (called as "tensile strength" hereinafter) and a break elongation ratio (called as "elongation ratio" hereinafter) were measured. The tensile strength was 10.0 (MPa) and the elongation ratio was 668.

EMBODIMENT 1

Test piece B (called as "B" hereinafter) was made by uniformly mixing 100 weight units of EPDM, 50 weight units of a not pre-dried natural zeolite that has been surface-treated by a solution including one weight % of γ-aminopropyltriethoxysilane under a normal room temperature, 80 weight units of the talc, 60 weight units of the paraffin oil, 2 weight units of stearic acid, 5 weight units of zinc oxide, 4 weight units of the cross linking agent, 0.5 weight units of sulfur. "B" was measured in tensile strength and elongation ratio. The tensile strength was 11.2 (MPa) and the elongation ratio was 708.

EMBODIMENT 2

Test piece C (called as "C" hereinafter)was made by uniformly mixing 100 weight units of EPDM, 50 weight units of a pre-dried natural zeolite that is surface-treated at a 100° C. temperature by a solution including one weight % of γ-aminopropyltriethoxysilane, 80 of weight units of the talc, 60 weight units of the paraffin oil, 2 weight units of stearic acid, 5 weight units of zinc oxide, 4 weight units of the cross linking agent, and 0.5 weight units of sulfur. "C" was measured in tensile strength and elongation ratio. The tensile strength was 13.3 (MPa) and the elongation ratio was 727.

EMBODIMENT 3

Test piece D (called as "D" hereinafter) was made by uniformly mixing 100 weight units of EPDM, 50 weight units of a pre-dried natural zeolite that is surface-treated at a 100° C. temperature by a solution including two weight % of γ-aminopropyltriethoxysilane, 80 of weight units of the talc, 60 weight units of the paraffin oil, 2 weight units of stearic acid, 5 weight units of zinc oxide, 4 weight units of the cross linking agent, and 0.5 weight units of sulfur. "D" was measured in tensile strength and elongation ratio. The tensile strength was 12.3 (MPa) and the elongation ratio was 721.

EMBODIMENT 4

Test piece E (called as "E" hereinafter) was made by uniformly mixing 100 weight units of EPDM, 50 weight units of a pre-dried natural zeolite that is surface-treated at a 100° C. temperature by a solution including four weight % of γ-aminopropyltriethoxysilane, 80 weight units of the talc, 60 weight units of the paraffin oil, 2 weight units of stearic acid, 5 weight units of zinc oxide, 4 weight units of the cross linking agent, and 0.5 weight units of sulfur. "E" was measured in tensile strength and elongation ratio. The tensile strength was 11.8 (MPa) and the elongation ratio was 722.

FIG. 2 is a graph showing the tensile strength (MPa) and elongation ratio (%) regarding test pieces A to E that are the comparative example 1 and the embodiments 1 to 4. As shown in FIG. 2, a polymer compounded by a carbon black is 12.0 (MPa) in tensile strength. It is noted that the natural zeolite surface-treated by a silane coupling agent can give a higher tensile strength than not surface-treated one without decreasing its elongation ratio as shown in FIG. 2. It should be also noted that the natural zeolite is better pre-dried and that the natural zeolite is better surface-treated at about 100° C. temperature by the silane coupling agent. In addition, the solution preferably includes one to four weight % of the silane coupling agent, and particularly one weight % is best. Moreover, the natural zeolite surface-treated by the silane coupling agent can provide a tensile strength not less than a carbon black that has been conventionally utilized.

Thus, according to the present invention, a natural zeolite is surface-treated by the silane coupling agent, which enhances the zeolite to be better combined with a polymer material like rubber or synthetic resin. This enables to attain a reinforced strength not less than a reinforcing material such as carbon black regarding the polymer material, achieving a lower cost thereof.

What is claimed is:

1. A reinforcing compounding material including a natural zeolite that has been surface-treated at 100° C. by a solution including 1 to 4 weight % of a silane coupling agent wherein said zeolite has a grain diameter not more than 6 μm, and said zeolite is a pre-dried zeolite.

2. The reinforcing compounding material as recited in claim 1, wherein said silane coupling agent has a chemical formula described hereunder:

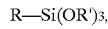

in which R is one selected among amino-, vinyl-, epoxy-, mercapto-, chlorine-, and methacryl-; R' is one selected among methyl-, ethyl-, and β-methoxyethyl-.

3. The reinforcing compounding material as recited in claim 1, wherein said silane coupling agent is a α-aminopropyltriethoxysilane.

* * * * *